United States Patent [19]
Masaki

[11] 3,778,646

[45] Dec. 11, 1973

[54] SEMICONDUCTOR LOGIC CIRCUIT

[75] Inventor: Akira Masaki, Kanagawa-ken, Sagamihara-shi, Japan

[73] Assignee: Hitachi, Ltd., Tokyo, Japan

[22] Filed: Jan. 31, 1972

[21] Appl. No.: 222,247

[30] Foreign Application Priority Data

Feb. 5, 1971 Japan ..................... 46/4229

[52] U.S. Cl. .................. 307/215, 307/218, 307/237, 307/264, 307/297, 328/175

[51] Int. Cl. ...... H03k 19/34, H03k 5/08, H03k 1/14

[58] Field of Search .................. 307/213, 215, 218, 307/235 R, 237, 296, 297, 310, 264; 328/173, 175, 146, 92; 330/22, 23, 25, 26, 28, 40, 30 D, 69

[56] References Cited

UNITED STATES PATENTS

| | | | |
|---|---|---|---|
| 3,300,658 | 1/1967 | Slusher et al. | 307/297 |
| 3,182,269 | 5/1965 | Smith | 330/25 X |
| 3,022,457 | 2/1962 | Doan | 330/40 X |
| 3,103,617 | 9/1963 | Schneider et al. | 307/297 X |
| 3,194,985 | 7/1965 | Smith, Jr. et al. | 330/30 D |
| 3,259,761 | 7/1966 | Narud et al. | 307/297 X |
| 3,419,810 | 12/1968 | Xylander | 330/30 D X |
| 3,443,202 | 5/1969 | Moulton | 307/297 X |
| 3,515,904 | 6/1970 | Stopper | 307/290 |
| 3,521,086 | 7/1970 | Slob | 330/28 X |
| 3,522,446 | 8/1970 | Kodama | 307/215 |
| 3,539,824 | 11/1970 | Yu et al. | 307/215 X |
| 3,551,836 | 12/1970 | Greeson, Jr. | 330/30 D |
| 3,573,488 | 4/1971 | Beelitz | 307/215 X |
| 3,590,274 | 6/1971 | Marley | 307/215 |
| 3,668,429 | 6/1972 | Ainsworth | 307/235 R |

OTHER PUBLICATIONS

Zakian et al., Electronic Engineering (Publication); p. 251–253, 4/1966;

Briot, "Linear Voltage Regulation Versus Temperature", Vol. 13, No. 5, p. 1253–1254; 10/1970.

Patchett, "Emitter-follower as a Constant Voltage Source," Electronic Engineering (Pub.), p. 205–208, 2/1969;

Keller et al., "Current Source Generator," Vol. 12, No. 11, p. 2031, 4/1970.

*Primary Examiner*—John W. Huckert
*Assistant Examiner*—L. N. Anagnos
*Attorney*—Craig, Antonelli & Hill

[57] ABSTRACT

A current mode type semiconductor logic circuit comprises at least one grounded-emitter transistor through which a power source is connected to the logic circuit. The output of the logic circuit is fed back to the grounded-emitter transistor through a feedback circuit. As a result, the variation in the output of the logic circuit can be controlled to a minimum even when the load of the logic circuit is varied.

14 Claims, 6 Drawing Figures

SEMICONDUCTOR LOGIC CIRCUIT

BACKGROUND OF THE INVENTION:

The present invention relates to semiconductor logic circuits and more particularly to improvements in a current mode type semiconductor logic circuit comprising at least one input transistor to which an input signal is applied, and at least one reference transistor to which a reference signal is applied.

DESCRIPTION OF THE PRIOR ART

The semiconductor logic circuits used in high speed electronic computers are supposed to satisfy the requirements of high operating speed, high integration, and low power consumption.

The current mode type semiconductor logic circuit has most generally been in use as a high speed logic circuit in the prior art. This type of logic circuit consumes a large amount of power. To solve this problem, a direct-coupled type logic circuit has been proposed. This logic circuit, however, gives rise to many problems if it is used in a monolithic IC system.

SUMMARY OF THE INVENTION

An object of the present invention is to provide a semiconductor logic circuit operable consuming very little power and capable of controlling the output voltage variation to a minimum even if a partial impedance variation occurs in the load circuit network.

Another object of this invention is to provide a semiconductor logic circuit capable of compensating for the dispersion of circuit elements and for variations in operating conditions.

Still another object of this invention is to provide a semiconductor logic circuit capable of driving a transmission line by its collector output even when the logic circuit is fabricated in a monolithic IC system.

Briefly, the above objects are realized in a current mode type semiconductor logic circuit in which a power source is connected to the logic circuit by way of at least one emitter-grounded transistor, and the output of the logic circuit is fed back to the base of the emitter-grounded transistor by way of a feedback circuit.

DESCRIPTION OF THE PREFERRED EMBODIMENTS

Figures 1, 2, 3A:
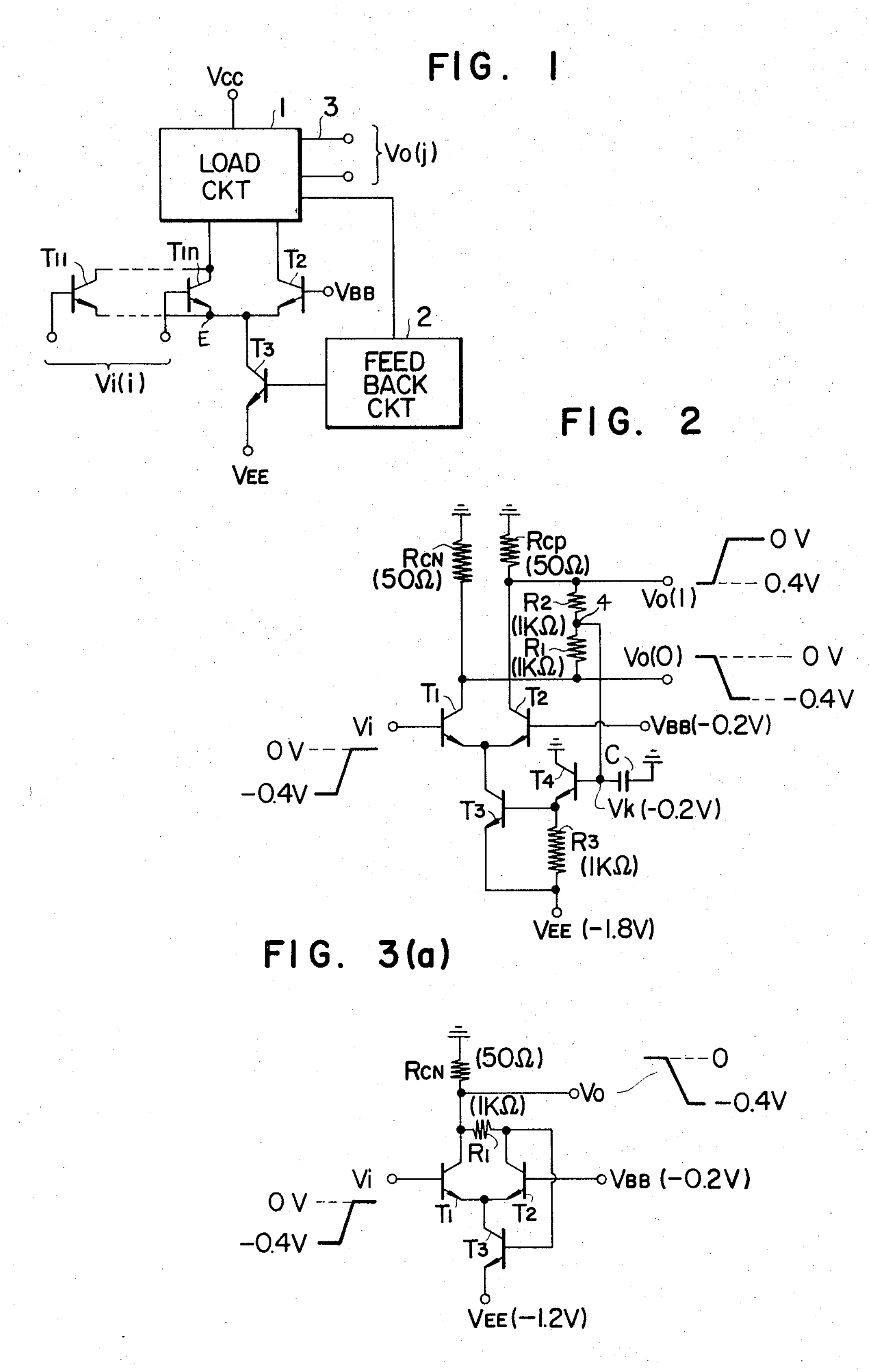
FIG. 1 is a circuit diagram showing the fundamental composition of the logic circuit of this invention.
FIGS. 2, 3(a), 3(b), 4 and 5 are circuit diagrams showing logic circuits embodying this invention.

Referring to FIG. 1, there is shown the fundamental arrangement of the logic circuit of this invention, wherein the references $T_{11}$ through $T_{1n}$ denote transistors respectively, to which an input signal Vi(i) is applied, $T_2$ a transistor, to which a reference voltage $V_{BB}$ is applied, and $T_3$ a grounded-emitter transistor, through which an emitter source voltage $V_{EE}$ is applied to a common emitter terminal E of said transistors $T_{11}$ through $T_{1n}$ and $T_2$. The output of a load circuit 1 of the logic circuit comprising transistors $T_{11}$ through $T_{1n}$ $T_2$ is fed back to the base of grounded-emitter transistor $T_3$ via a feedback circuit 2.

In this logic circuit, as is well-known, an OR output or its inverted output is obtained at the output terminal 3 according to the result of comparison between the reference voltage $V_{BB}$ and the input signal applied to the base of one of the transistors $T_{11}$ through $T_{1n}$. According to the teaching of this invention, the output $V_o(j)$ is fed back to the base of the grounded-emitter transistor, thereby minimizing any variation in the output voltage of the logic circuit, even if the impedance is partially varied in the load circuit 1. Further objects and advantages of the invention will be best understood by reference to the following specification of illustrative embodiments.

Unless specifically noted, it is assumed that the current amplification factor $h_{FE}$ of the transistor used is sufficiently large, the forward voltage drop $V_{BE}$ across the base and emitter is about 0.8V, and the transistor is operated unsaturably until its base-collector junction is biased forward at about 0.5V. This condition is almost fully satisfied in the ordinary silicon epitaxial planar transistor for logic circuits.

EXAMPLE 1

Referring to FIG. 2, there is shown a logic circuit embodying this invention wherein the resistance values of output resistors $R_1$ and $R_2$ are determined to be sufficiently large compared with those of collector resistors $R_{CN}$ and $R_{CP}$ and, hence, a voltage of approximately half the output voltage is produced at the connection point 4 of $R_1$ and $R_2$ when transistor $T_1$ or $T_2$ is conducting. This voltage is applied to the base of a transistor $T_4$. The emitter of transistor $T_4$ is connected to the base of a grounded-emitter transistor $T_3$, and an emitter source voltage $V_{EE}$ is applied to the emitter of transistor $T_4$ by way of resistor $R_3$.

Because the base-emitter voltage $V_{BE}$ of transistors $T_3$ and $T_4$ is constant, the voltage $V_K$ at the connection point of the output resistors $R_1$ and $R_2$ is given as $$V_K = V_{EE} + 2V_{BE} = -1.8V + 2 \times 0.8V = -0.2V \quad (1)$$

Therefore, the output voltage $V_o$ at the collector on the side of whichever transistor $T_1$ or $T_2$ is conducting is expressed as $$V_o = 2V_K = 2(V_{EE} + 2V_{BE}) = -0.4V \quad (2)$$

In this current mode type semiconductor logic circuit comprising transistors $T_1$ and $T_2$, the output voltage $V_o$ is determined essentially by the emitter source voltage $V_{EE}$ on condition that the resistance values of the load resistors $R_{CN}$ and $R_{CP}$ are sufficiently smaller than those of the output resistors $R_1$ and $R_2$, even if small variations occur in the value of the load resistors $R_{CN}$ and $R_{CP}$. Under this condition, therefore, the output voltage can be kept minimally affected by the variation in the load impedance. By suitably determining the value of a capacitor C inserted in the base of transistor $T_4$, an output voltage with the desired waveform can be obtained.

EXAMPLE 2

Figure 3B:
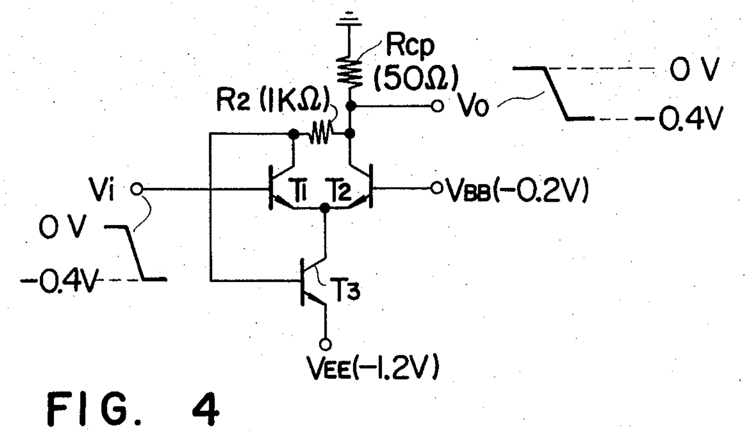

In FIG. 3(*a*), an output resistor $R_1$ is connected across the collectors of transistors $T_1$ and $T_2$, and one end of resistor $R_1$ is connected to the base of a ground-emitter transistor $T_3$. In this circuit, when the transistor $T_1$ is in the conducting state, the base current of grounded-emitter transistor $T_3$, which current flows via the output resistor $R_1$, is sufficiently small. Therefore, the collectors of transistors $T_1$ and $T_2$ and the base of transistor $T_3$ are at nearly the same potential.

Hence, the output voltage $V_o$ obtainable at conduction of transistor $T_1$ is given as $$V_o = V_{EE} + V_{BE} = -0.4V$$

When the transistor $T_2$ is conducting, its collector load becomes $R_{CN} + R_1$, and the collector current is far smaller than when the transistor $T_1$ is conducting. As a result the output voltage $V_o$ becomes almost zero. In this embodiment, although only the inverted output is obtainable, a smaller number of circuit elements suffices than in the embodiment, Example 1. Furthermore, because $V_{EE}$ is small and the mean current to flow at switching transistors $T_1$ and $T_2$ is small, the necessary power consumption is reduced.

EXAMPLE 3

This example, as shown in FIG. 3(*b*), is similar to Example 2, except that this circuit makes an "ON" output available.

EXAMPLE 4

Figures 4, 5:
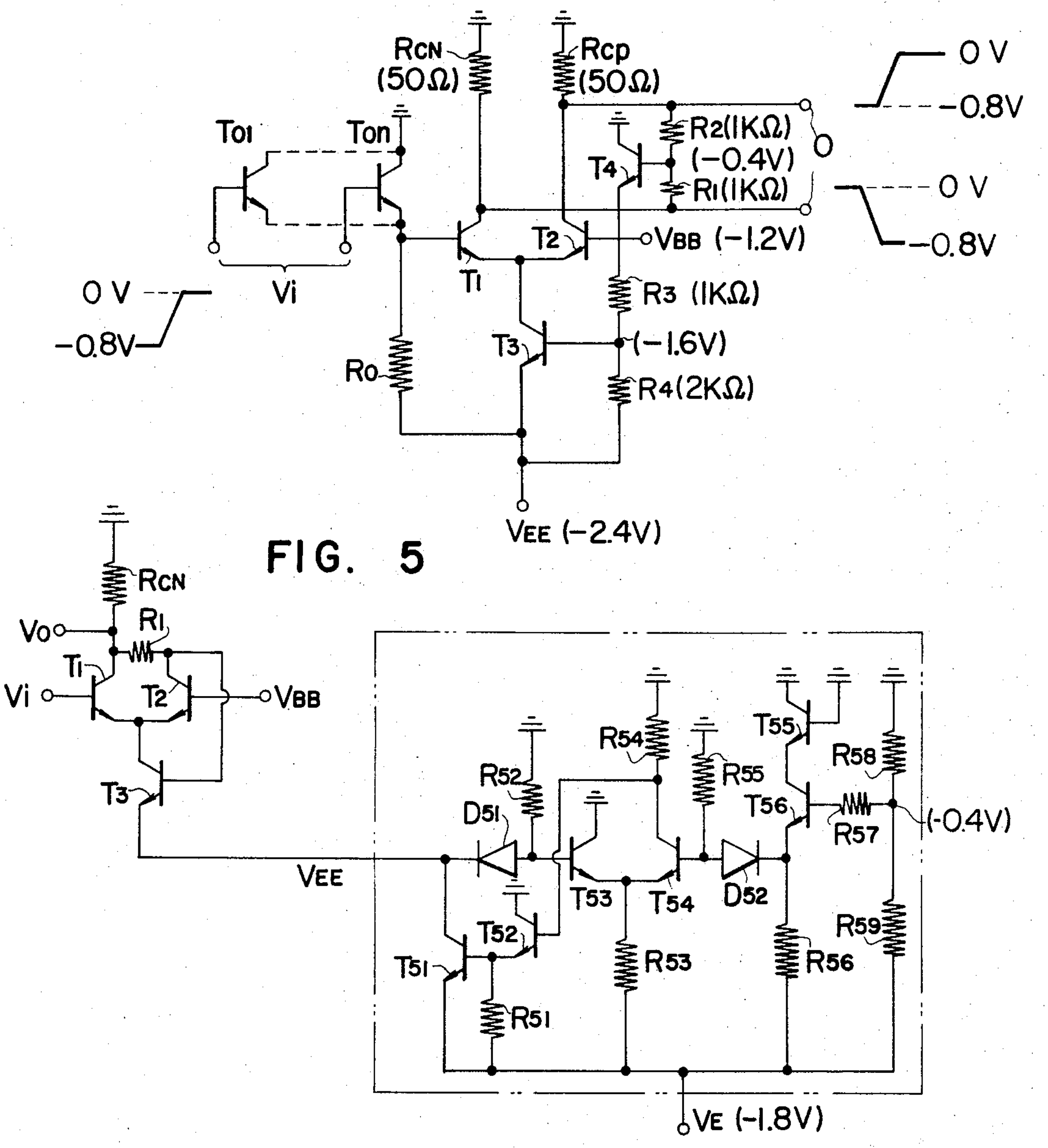

This example, as shown in FIG. 4, is a modification of Example 1. In FIG. 4, the input signal is applied to the base of transistors $T_{01}$ through $T_{0n}$. This circuit is characterized by its capability of delivering a large amplitude output.

EXAMPLE 5

This example is shown in FIG. 5 wherein a stabilizing circuit using an emitter source voltage $V_{EE}$ provided as in Example 2 is employed to compensate for dispersion or temperature variation in $V_{BE}$, $h_{fe}$, etc., of the transistors. The aim of this stabilizing circuit is to make the output voltage of transistor $T_1$ equal to the voltage determined only by the value of the source voltage $V_E$ and the ratio of the values of resistors $R_{58}$ and $R_{59}$ when transistor $T_1$ is in the conducting state.

In the stabilizing circuit (indicated by the dotted line), the output of a differential amplifier comprising transistors $T_{53}$, $T_{54}$, resistors $R_{53}$ and $R_{54}$ is applied to a transistor $T_{51}$ via a transistor $T_{52}$ and a resistor $R_{51}$. Therefore, the collector voltage of transistor $T_{51}$ (i.e., the emitter source voltage $V_{EE}$) can be made equal to the emitter voltage of transistor $T_{56}$. Hence, if the values of transistors $T_{56}$ and $T_3$ are determined to be nearly the same, and likewise the values of resistors $R_{57}$ and $R_1$, and also the value of resistor $R_{56}$ is determined so that the collector current of $T_3$ is nearly equal to that of transistor $T_{56}$, the emitter voltage of transistor $T_{56}$, namely the emitter source voltage $V_{EE}$, is stabilized. The purpose of the transistor $T_{55}$ is to approximate the operating conditions of two transistors $T_{56}$ and $T_3$.

It is to be noted that resistance and voltage values indicated in the drawings are only for reference; the invention is not limited to those values. The transistors used in the foregoing embodiments may be of either npn or pnp.

In the conventional current mode type semiconductor logic circuit fabricated in a monolithic IC system, the ratio of resistance values can be relatively accurately controlled within the same monolithic circuit. Hence, the accuracy of the output voltage can be controlled to be fairly high if the emitter resistor and collector load resistor are formed in the same monolithic circuit. In a monolithic circuit, however, it is difficult to reduce the dispersion of the absolute value of resistance. When the collector load resistor is not included in the same monolithic circuit but is connected thereto externally, the accuracy of the output voltage is significantly lowered. This will result in saturation of the circuit, to lower the operating speed and reduce the noise margin. In a large electronic computer, it is necessary to minimize the delay caused by elongated length of a transmission line. To this effect the distributed line for transmission must be terminated by a resistor whose characteristic impedance is nearly equal to that of the distributed line network. In such case it is apparently impossible for one monolithic circuit to include both the emitter resistor and the collector load resistor; here the aforementioned problem is inevitable.

Whereas, according to this invention, as described above, variations in the output voltage can be controlled to a minimum even when partial impedance variation takes place in the load circuit network of the collector. Thus, in other words, the invention enables the use of a monolithic IC system to manufacture efficient logic circuits free of the prior art problems.

I claim:

1. In a current mode type semiconductor logic circuit having at least one input transistor to which an input signal is applied, at least one reference transistor to which a reference signal is applied, said input transistor being adapted so as to operate when said input signal is larger than said reference signal, a power source, and a load circuit connected to said input and reference transistors for deriving out therefrom an output signal from said input and reference transistors, the improvement which comprises at least one grounded emitter transistor through which said power source is connected to said input and reference transistors, and a feedback circuit connected between said load circuit and said grounded emitter transistor for feeding back said output signal thereto.

2. A logic circuit according to claim 1, wherein said feedback circuit comprises output resistor means connected between the outputs of said input and reference transistors, and a grounded collector transistor connected between said output resistor means and the input of said grounded emitter transistor.

3. A logic circuit according to claim 1, wherein said feedback circuit comprises an output resistor connected between the outputs of said input and reference transistors, and said grounded emitter transistor connected to said output resistor.

4. A logic circuit according to claim 1, which comprises a stabilizing circuit connected between said grounded emitter transistor and said power source for stabilizing the emitter voltage of said grounded emitter transistor.

5. A current mode type semiconductor logic circuit comprising:

at least one input transistor to which an input signal is to be applied;

a reference transistor to which a reference signal is to be applied, said input and reference transistors being coupled together in common for receiving a source of power;

a load means connected to each of said input and reference transistors for generating a signal when said input signal is larger than said reference signal;

a power coupling transistor, having its emitter connected to said source of power, connected to the common connection point of said input and reference transistors for coupling thereto said source of power; and means connected between said load means and power coupling transistor, for feeding back the output of said load circuit to said power coupling transistor, so as to compensate for variations in the output of said logic circuit.

6. A current mode type semiconductor logic circuit according to claim 5, wherein said feedback means comprises means for resistively connecting the output of said load means to said power coupling transistor.

7. A current mode type semiconductor logic circuit according to claim 6, wherein said feedback means comprises first and second resistors connected in series between said input and reference transistor outputs, and a feedback transistor coupling the common connection of said first and second resistor to said power coupling transistor.

8. A current mode type semiconductor logic circuit according to claim 7, wherein said at least one input transistor comprises a first input transistor to which said input signal is applied and a second input transistor connected to the output of said first input transistor and to said reference and said power coupling transistor, the output of said second input transistor being connected to said load means.

9. A current mode type semiconductor logic circuit according to claim 6, wherein said feedback means comprises a resistor connected between said input and reference transistors and a conductor for coupling the output of one of said input and reference transistor to said power coupling transistor.

10. A current mode type semiconductor logic circuit according to claim 9, wherein said conductor is connected to said input transistor.

11. A current mode type semiconductor logic circuit according to claim 9, wherein said conductor is connected to said reference transistor.

12. A current mode type semiconductor logic circuit according to claim 8, further comprising a stabilizing circuit connected between said power source and said power coupling transistor for compensating for variation in the characteristics of said transistors.

13. A current mode type semiconductor logic circuit according to claim 12, wherein said stabilizing circuit comprises a differential amplifier circuit having one of its inputs coupled to said power coupling transistor and the other coupled to a compensating power supply circuit, the output of said differential amplifier being connected through a pair of transistors to said power coupling transistor.

14. A current mode type semiconductor logic circuit according to claim 13, wherein said compensating power supplying circuit comprises a pair of transistors connected in series, the characteristics of one of which corresponds substantially to said power coupling transistor and a biasing transistor connected between said power source and said one transistor of said pair for maintaining the collector current thereof substantially the same as the collector current of said power coupling transistor.

* * * * *